(12) United States Patent
Michel

(10) Patent No.: US 8,454,029 B2
(45) Date of Patent: Jun. 4, 2013

(54) WHEEL SUSPENSION FOR MOTOR VEHICLES

(75) Inventor: Wilfried Michel, Riedenburg (DE)

(73) Assignee: Audi AG, Ingolstadt (DE)

( * ) Notice: Subject to any disclaimer, the term of this patent is extended or adjusted under 35 U.S.C. 154(b) by 25 days.

(21) Appl. No.: 13/126,892

(22) PCT Filed: Aug. 21, 2009

(86) PCT No.: PCT/EP2009/006063
§ 371 (c)(1),
(2), (4) Date: Apr. 29, 2011

(87) PCT Pub. No.: WO2010/049026
PCT Pub. Date: May 6, 2010

(65) Prior Publication Data
US 2011/0210525 A1    Sep. 1, 2011

(30) Foreign Application Priority Data

Oct. 29, 2008 (DE) .......................... 10 2008 053 617

(51) Int. Cl.
*B60G 17/04* (2006.01)
(52) U.S. Cl.
USPC ............... 280/5.514; 280/6.157; 280/124.157
(58) Field of Classification Search
USPC ................ 280/5.5, 5.514, 5.515, 6.15, 6.157, 280/6.16, 124.162, 124.157; 267/33–35, 267/64.16, 64.17, 64.19, 64.23, 64.26, 64.27, 267/64.28, 218
See application file for complete search history.

(56) References Cited

U.S. PATENT DOCUMENTS

| | | | | | |
|---|---|---|---|---|---|
| 2,257,913 | A | * | 10/1941 | Maranville | 267/33 |
| 3,127,158 | A | * | 3/1964 | Broadwell | 267/64.19 |
| 3,414,278 | A | * | 12/1968 | Schmid | 280/5.514 |
| 4,211,429 | A | * | 7/1980 | Howard | 280/124.162 |
| 5,060,959 | A | * | 10/1991 | Davis et al. | 280/5.514 |
| 5,366,048 | A | * | 11/1994 | Watanabe et al. | 188/267.1 |
| 6,827,341 | B2 | * | 12/2004 | Bank et al. | 267/64.21 |
| 7,469,910 | B2 | * | 12/2008 | Munster et al. | 280/5.514 |
| 2006/0125325 | A1 | | 6/2006 | Beaulieu | |
| 2006/0163863 | A1 | * | 7/2006 | Ellmann et al. | 280/788 |
| 2006/0219503 | A1 | * | 10/2006 | Kim | 188/282.2 |
| 2007/0210539 | A1 | * | 9/2007 | Hakui et al. | 280/5.514 |
| 2009/0045595 | A1 | * | 2/2009 | Michel | 280/6.157 |
| 2009/0108546 | A1 | * | 4/2009 | Ohletz et al. | 280/6.16 |

FOREIGN PATENT DOCUMENTS

| | | |
|---|---|---|
| DE | 725 687 | 9/1942 |
| DE | 1 816 597 U | 8/1960 |
| DE | 30 37 179 | 4/1982 |
| DE | 102 00 608 A | 8/2002 |
| DE | 103 06 121 A1 | 9/2004 |

(Continued)

*Primary Examiner* — Joseph Rocca
*Assistant Examiner* — Robert A Coker
(74) *Attorney, Agent, or Firm* — Henry M. Feiereisen LLC

(57) ABSTRACT

The invention relates to a wheel suspension for motor vehicles with level adjustment of the body, having a vertical adjusting device (22; 80) which is disposed between a wheel guide element and the superstructure of the motor vehicle and which is particularly designed as a ball screw mechanism driven by an electric motor and acts on an adjusting plate spring (34) of at least one support spring (14), wherein the vertical adjusting device (22; 80) is outwardly sealed by at least one enclosing rubber-elastic bellows (50, 52; 100). In order to prevent deformation of the at least one bellows and ingress of dirt or moisture into the vertical adjusting device, the invention proposes that the interior space (54, 56; 102) enclosed by the bellows (50, 52; 100) is connected directly or indirectly to an auxiliary volume (66; 108) positioned outside of the bellows (50, 52; 100).

15 Claims, 2 Drawing Sheets

FOREIGN PATENT DOCUMENTS

| | | |
|---|---|---|
| DE | 10 2005 001 739 | 7/2006 |
| EP | 1 953 013 A | 8/2008 |
| JP | 57 131649 U | 8/1982 |
| JP | 57 141247 U | 9/1982 |
| JP | 60 094879 A | 5/1985 |
| SU | 1 216 475 A1 | 3/1986 |

* cited by examiner

WHEEL SUSPENSION FOR MOTOR VEHICLES

CROSS-REFERENCES TO RELATED APPLICATIONS

This application is the U.S. National Stage of International Application No. PCT/EP2009/006063, filed Aug. 21, 2009, which designated the United States and has been published as International Publication No. WO 2010/049026 A1 and which claims the priority of German Patent Application, Serial No. 10 2008 053 617.2, filed Oct. 29, 2008, pursuant to 35 U.S.C. 119(a)-(d).

BACKGROUND OF THE INVENTION

The invention relates to a wheel suspension for motor vehicles with level adjustment of the body.

From DE 30 37 179, it is known to protect the piston rod in a telescopic shock absorber arrangement for wheel suspensions of motor vehicles by means of an outwardly sealed, rubber-elastic bellows against dirt and moisture, wherein the interior space of the bellows is connected to an auxiliary volume. The auxiliary volume is formed by a cylindrical tube which is arranged around the shock-absorber tube of the shock absorber, or possibly directly formed onto the bellows.

DE 725 687 discloses a shock absorber arrangement for compensating pressure fluctuations within the bellows of two telescopic shock absorbers articulated in a housing, with the two bellows being connected together through a housing connection.

DE 102 00 608 A discloses a shock absorber arrangement in which the air space within the bellows is in communication with the surroundings through a line which ends in an air filter. During spring movements, air is either taken in or pushed out and passes through the air filter. The purpose is to prevent sand and/or dust particles from reaching into the interior of the space defined by the bellows. Sand would effectively act as a grinding paste between the spring washer and the spring winding. In that case, the spring would not reach its service life and would break prematurely.

The solution known from DE 102 00 608 A is sufficient for a simple system, essentially comprised of spring and spring washer. A disadvantage is the fact that the filter clogs sooner or later depending on the type of application, i.e. in what environment the motor vehicle moves. If there is no longer any free air passage, the bellows would substantially collapse or even burst. However, the biggest disadvantage is that the filter can no longer filter finer particles (smaller than sand). If this principle were to be used in a mechanical adjustment which, for example, includes a sensitive ball screw mechanism, this would not be sufficient. The grease of the ball screw mechanism may under no circumstances be contaminated because even finest particles would change the grease in its consistency so that the ball screw mechanism would be destroyed. Furthermore, the filter is not capable to keep away moisture, condensation water or splash water. Moisture would cause corrosion at the roller bearings and at the spindle/nut unit and would also destroy the ball screw mechanism.

SUMMARY OF THE INVENTION

It is the object of the invention to further develop a wheel suspension with a vertical adjusting device and a bellows concealing the vertical adjusting device in such a way that a constant pressure compensation in the interior space of the bellows is ensured in a structurally beneficial arrangement.

This object is attained in accordance with the invention by a wheel suspension for motor vehicles with level adjustment of the body, wherein the wheel suspension includes a vertical adjusting device which is arranged between a wheel guide element and the superstructure of the motor vehicle and which is especially constructed as a ball screw mechanism and acts on an adjusting plate spring of at least one support spring, wherein the vertical adjusting device is sealed toward the outside by at least one surrounding rubber-elastic bellows, wherein the interior space surrounded by the bellows is connected directly or indirectly to an auxiliary volume as compensating chamber positioned outside of the bellows. Advantageous further refinements of the invention are set forth in the further patent claims.

In accordance with the invention, it is proposed to indirectly or directly connect the interior space surrounded by the bellows to an auxiliary volume positioned outside of the bellows as a compensating chamber. The provision of the auxiliary volume positioned outside renders it possible to produce a reliable pressure compensation without any structural constraints; At the same time, the vertical adjusting device arranged within the bellows is effectively protected against ingress of dirt and foreign particles.

In particular, the auxiliary volume can be formed by a rubber-elastic bellows which is connected to the interior space and is inexpensive to manufacture and via which an air exchange essentially without resistance can take place. In this way, even impermissible deformations of the bellows, which surrounds the vertical adjusting device, as a result of pressure fluctuations can be excluded.

In accordance with the invention, the air volume flowing around the vertical adjusting device is hermetically sealed to the outside. Consequently, an air exchange with the outside does not take place. There is no danger of penetrating moisture. If, in addition, the space is filled with dried air, condensation water formation would also not occur. This becomes possible because the second corresponding air volume is coupled to the air volume within the bellows without any throttling action. If the level of the motor vehicle is changed, air is pushed into the compensating bellows or pulled out therefrom depending on the direction. Even in the case of temperature changes, the compensation bellows acts as a compensation element. Because of the harmonica-like configuration, the resistance applied by the compensating bellows during expansion and constriction is extremely low.

If the auxiliary volume is connected by a connecting line to the interior space of the bellows, any free spaces possibly existing in the motor vehicle can be utilized for arranging and mounting the auxiliary volume.

The bellows and the auxiliary volume may particularly advantageously be filled with a dehydrated gas, particularly air, in order to keep functional interruptions or corrosion damage from the components surrounded by the bellows.

In a wheel suspension having a vertical adjusting device, attached to a hollow section of a beam of the body of the motor vehicle, the auxiliary volume may be arranged in a structurally particularly advantageous manner directly in the beam. In particular, the bellows can be positioned as auxiliary volume in the hollow space of the beam and, thus, be reliably protected against external influences, for example, falling rocks.

Moreover, in a suspension strut as wheel suspension with a central vertical adjusting device arranged as wheel suspension around the telescopic shock absorber of the suspension strut, a support spring and a storage spring, both springs and the vertical adjusting device can be surrounded by at least one bellows which is connected to at least one external auxiliary volume as compensating chamber.

The auxiliary volume can then be provided as externally located bellows which is connected via a connecting line and via connecting ducts in the vertical adjusting device and the shock absorber to the interior space of the bellows.

In a preferred flow pattern, a flow path, particularly an annular gap, can be provided within the vertical adjusting device and positioned in terms of flow between the external auxiliary volume and the interior space surrounded by the bellows. The vertical adjusting device can be connected in this bellows with a connection side via the connecting duct with the auxiliary volume. At the end of the vertical adjusting device, which end is distal to the connection side, the flow path feeds into the interior space which is surrounded by the bellows. Preferably, the flow path can be constructed as an annular gap between a hollow cylindrical threaded spindle of the ball screw mechanism and a shock-absorber cylinder arranged therein.

Consequently, the cooling air flows especially effectively directly outside of the shock absorber and within the sleeve-shaped threaded spindle and directly acts upon component surfaces that are under temperature stress. For structural and manufacturing reasons, it can be advantageous to provide in the area of the lower roller bearing of the threaded spindle connecting ducts on the shock-absorber tube of the shock absorber in order to connect the annular cooling duct in the area of the piston rod of the shock absorber with the space that is surrounded by the bellows. For structural and manufacturing reasons, the connecting ducts are designed advantageously as transverse bores in the threaded spindle, in particular in flow direction upstream of the lower roller bearing. In this manner, structurally complicated axial grooves or breakthroughs which are embossed into the shock-absorber tube or possibly formed in an intermediate ring or worked directly into the inner bearing ring of the roller bearing can be omitted.

In particular in a wheel suspension with two or more bellows, a reliable pressure compensation between the interior spaces of these bellows and the external auxiliary volumes are of importance. Against this background, the interior spaces of the bellows which are hermetically sealed relative to the outside can be fluidly connected in series with the flow path provided in the vertical adjusting device. When air flows into the interior spaces of the bellows, the air is initially conducted through the aforementioned flow path until reaching the interior space of a first bellows and subsequently to an interior space of a second bellows. The interior space of the first bellows is in this case located at an end which is distal to the connection side of the vertical adjusting device.

In the following two exemplary embodiments of the invention are explained in greater detail with additional particulars. The schematic drawing shows in:

DETAILED DESCRIPTION OF PREFERRED EMBODIMENTS

Figure 1:
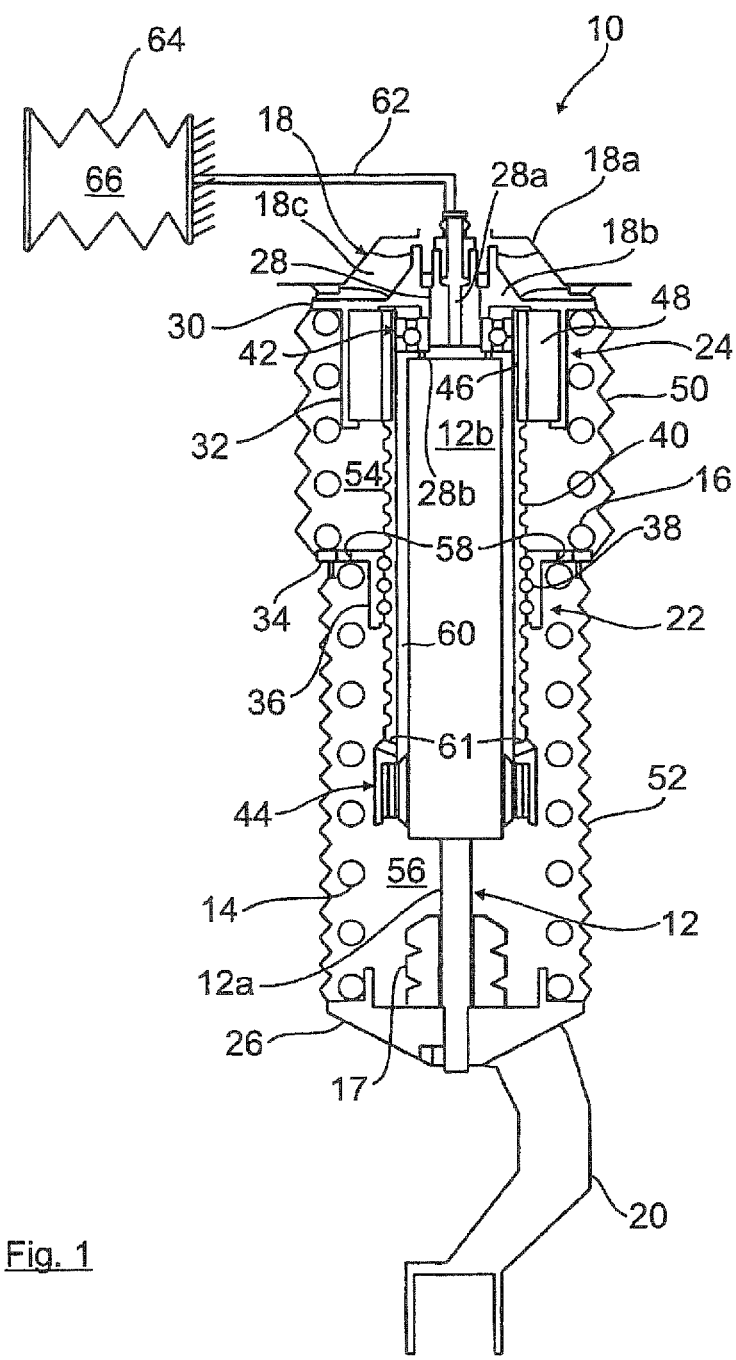
FIG. 1 a suspension strut for a wheel suspension of motor vehicles, with a support spring in surrounding relationship to a telescopic shock absorber, a storage spring, and a central vertical adjusting device, as well as two bellows in surrounding relationship to the springs and the vertical adjusting device, wherein interior spaces of the bellows are connected to an external auxiliary volume.

FIG. 1 schematically shows an active suspension strut 10 for a wheel suspension of motor vehicles which is essentially comprised of a telescopic shock absorber 12, a support spring 14, a storage spring 16, an upper shock-absorber bearing 18, and a lower shock-absorber support 20.

A level adjustment of the body of the motor vehicle and/or a roll and pitching stabilization are controlled by a vertical adjusting device 22 which is driven by an electric motor 24.

The shock absorber 12 is fastened with its downwardly protruding piston rod 12a to a lower plate spring 26. The plate spring 26 forms a structural unit with the shock-absorber support 20 which, in a known manner, is articulated or fastened to a wheel guide element of the wheel suspension of the motor vehicle, e.g. a suspension arm or a wheel carrier. In addition, a rubber-elastic contact buffer 17 is provided as additional spring at the plate spring 26.

The shock-absorber tube 12b of the shock absorber 12 is connected however via a central connection pin 28 to the shock-absorber bearing 18 which has an outer bearing housing 18a that is bolted to the not shown superstructure of the motor vehicle.

The bearing core 18b of the shock-absorber bearing 18 is connected via a rubber-elastic annular shock-absorber body 18c to the bearing housing 18a and forms with an upper plate spring 30 and a cup-shaped housing part 32 a structural unit which is arranged concentrically to the connecting pin 28.

On one hand, the storage spring 16 rests against the upper plate spring 30, and, on the other hand, on an adjusting plate spring 34. Moreover, the support spring 14 having an opposite biasing force rests on the lower plate spring 26 and also on the adjusting plate spring 34.

The adjusting plate spring 34 is constructed in a single piece with a threaded nut 36 which is in formfitting engagement in the axial direction via balls 38 with a threaded spindle 40 of the vertical adjusting device 32 or its ball screw mechanism.

The threaded spindle 40, in turn, is rotatably, but axially immovably supported through roller bearings 42, 44 on the connecting pin 28 and the shock-absorber tube 12b.

The threaded spindle 40 further supports the rotor 46 of the electric motor 24 whose stator 48 surrounds the rotor 46 while leaving a slight annular gap.

A rubber-elastic bellows 50, 52 is arranged around each of the storage spring 16 and the support spring 14. The upper bellows 50 is fastened to the plate spring 30 and to the adjusting plate spring 34 and, consequently, bounds an upper interior space 54. Moreover, the lower bellows 52 is fastened to the lower plate spring 26 and also to the adjusting plate spring 34 and thus forms the subjacent enclosed interior space 56. The interior spaces 54, 56 are connected to each other via breakthroughs 58 in the adjusting plate spring 34.

Provided in the connecting pin 28 of the shock-absorber tube 12b of the shock absorber 12 is a central bore 28a which feeds via a formed transverse duct 28b into an annular gap 60 formed between the shock-absorber tube 12b and the threaded spindle 40 and which is ultimately connected via transverse bores 61 in the threaded spindle 40 to the interior space 56 of the bellows of 52.

Connected to the central bore 28a is a connecting line 62 which is connected to a bellows 64 positioned outside of the bellows 50, 52 and forming an auxiliary volume 66. The bellows 64 is fastened, in a manner not illustrated, at a suitable location to the body of the motor vehicle.

The interior spaces 54, 56 and the auxiliary volume 66 are filled with dehydrated gas, particularly air.

When the wheel suspension deflects or in the case of the level adjustments of the wheel suspension with corresponding compression or decompression of the springs 14, 16, an air exchange can take place via the connection of the interior spaces 54, 56 of the bellows 50, 52 to the auxiliary volume 66 or the rubber-elastic bellows 64 in order to compensate pressure fluctuations within the bellows 50, 52 and to prevent undesired deformations. At the same time, the enclosed configuration of the bellows 50, 52 and the auxiliary volume 66 reliably prevents moisture and dirt from migrating into the vertical adjusting device 22 and the electric motor 24.

The air exchange takes place through the interior spaces 54, 56 connected to each other via the breakthroughs 58 in the adjusting plate spring 34, via the transverse bores 61, the annular gap 60, the transverse duct 28b and the central bore 28a in the connecting line 62 and from there into the auxiliary volume 66 of the bellows 64.

Figure 2:
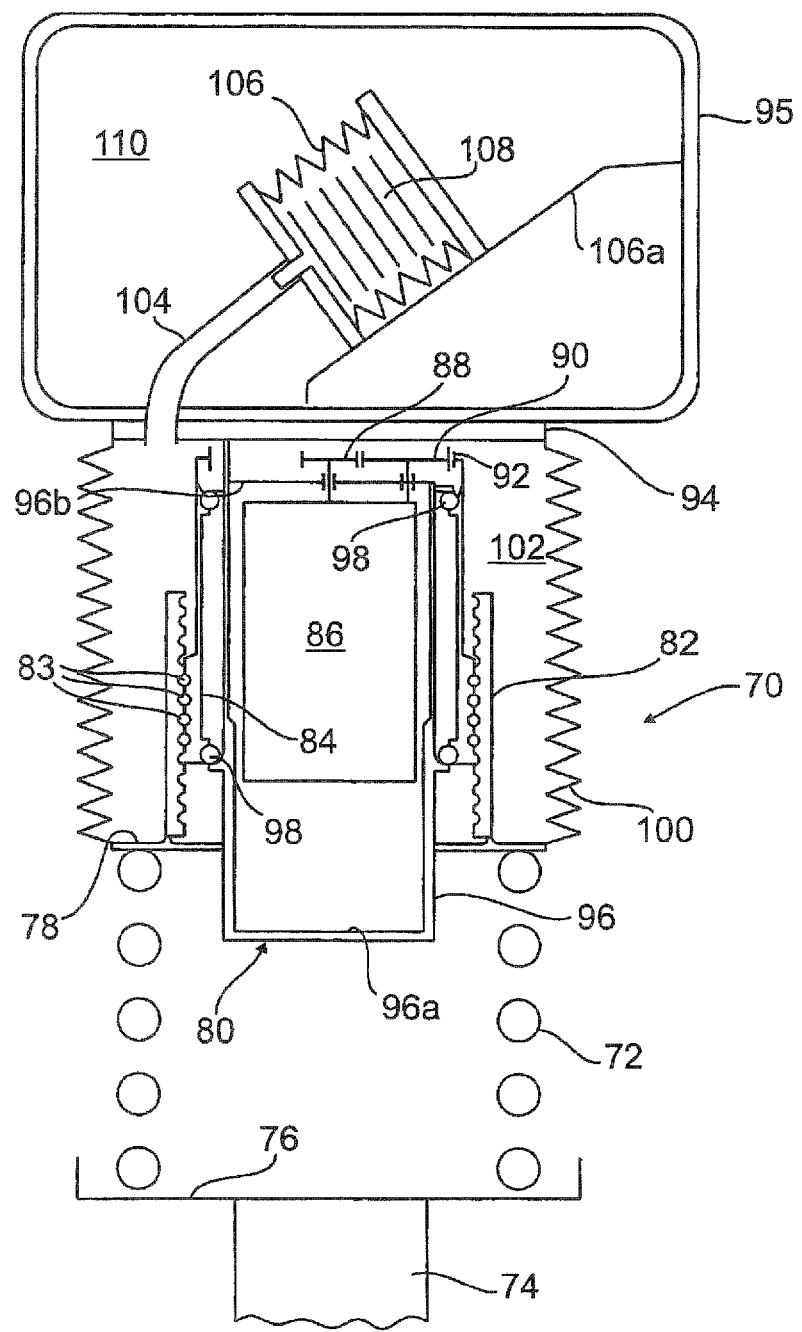
FIG. 2 a vertical adjusting device at a rear wheel suspension for motor vehicles, with a support spring and a central vertical adjusting device which is supported on a longitudinal beam of the superstructure of the motor vehicle, and with an auxiliary volume positioned in the longitudinal beam.

FIG. 2 shows another exemplary embodiment of the invention at a rear wheel suspension 70 for motor vehicles, which is only illustrated and described to the extent that it is necessary for understanding the present invention.

In this case, a support spring 72 constructed as a helical pressure spring is clamped between a lower plate spring 76, fastened to a suspension arm 74 as wheel guide element, and an adjusting plate spring 78 of a vertical adjusting device 80.

The vertical adjusting device 80 is essentially comprised of a ball screw mechanism with a threaded sleeve 82 which is non-rotatably fastened to an adjusting plate spring 78, a ball nut 84 which is connected via balls 83 in driving relationship with the threaded sleeve 82, and with a centrally arranged electric motor 86 which drives via a spur gear mechanism with gear wheels 88, 90 an internally toothed ring gear 92, wherein the ring gear 92 forms with the ball nut 84 a unitary structure.

The vertical adjusting device 80 additionally includes a support plate 94 by means of which it is firmly bolted to a longitudinal beam 95 of the supporting superstructure of the body of the motor vehicle by means of not shown bolts.

Fastened to the support plate 94 is a guide cylinder 96 which is closed by a bottom 96a and on which the ball nut 84 and the toothed ring 92 are rotatably supported via roller bearings 98. Rotatably supported in an intermediate wall 96b of the guide cylinder 96 are the drive shaft of the electric motor 86 with the gear 88 and the intermediate gear 90, which interact with the output ring gear 92.

By means of the electric motor 86, it is possible to turn the ball nut 84 via the spur gear mechanism 88, 90, 92, so that the non-rotatably held adjusting plate spring 78 is axially displaced upwardly or downwardly to more or less raise or lower the vehicle superstructure.

Fastened between the outer circumference of the support plate 94 and the adjusting plate spring 78 axially guided on the guide cylinder 96 is a rubber-elastic bellows 100 which surrounds the vertical adjusting device 80 and forms an airtight interior space 102 in combination with the adjusting plate spring 78.

The interior space 102 is connected via a connecting line 104 connected to the support plate 94 and a rubber-elastic bellows 106 to an auxiliary volume 108. The bellows 106 is hereby fastened to a mounting 106a provided in the longitudinal beam 95.

In the event of volumetric changes in the interior space 102, a constant air exchange can be realized via the elastic bellows 106 while avoiding pressure variations which deform the bellows 100. Still, the interior space 102 or the vertical adjusting device 80 is protected against ambient influences, such as moisture or dirt particles.

Air in the interior space 102 and in the auxiliary volume 108 can again be dehydrated.

What is claimed is:

1. A wheel suspension for a motor vehicle with level adjustment of the vehicle body, said wheel suspension comprising: a vertical adjusting device arranged between a wheel guide element and a superstructure of the motor vehicle, said vertical adjusting device being configured to act on an adjusting plate that supports an end of at least one helical spring; a rubber-elastic first bellows sealing the vertical adjusting device to surround an outside of the helical spring and surrounding an interior space, and an auxiliary volume which is positioned outside the bellows and connected indirectly or directly to the interior space and which forms a compensating chamber to provide a pressure compensation between the interior space and the auxiliary volume.

2. The wheel suspension of claim 1, wherein the vertical adjusting device is a ball screw mechanism driven by an electric motor.

3. The wheel suspension of claim 1, wherein the auxiliary volume is formed by a rubber-elastic second bellows which is connected to the interior space.

4. The wheel suspension of claim 3, further comprising a connecting line connecting the auxiliary volume to the interior space of the second bellows.

5. The wheel suspension of claim 3, wherein the second bellows and the auxiliary volume are filled with dehydrated gas.

6. The wheel suspension of claim 5, wherein the dehydrated gas is air.

7. The wheel suspension of claim 1, wherein the vertical adjusting device is supported on a hollow section of a longitudinal beam of the body of the motor vehicle, said auxiliary volume being arranged directly in the longitudinal beam.

8. The wheel suspension of claim 7, wherein the second bellows is arranged as the auxiliary volume in a hollow space of the longitudinal beam.

9. The wheel suspension of claim 1, further comprises a suspension strut having a telescopic shock absorber, said vertical adjusting device being arranged around the telescopic shock absorber, wherein at least one of the helical spring and a storage spring of the suspension strut, and the vertical adjusting device are surrounded by the first bellows which is connected to the external auxiliary volume.

10. The wheel suspension of claim 9, wherein the auxiliary volume is formed by an external second bellows which is connected via a connecting line in the vertical adjusting device and via connecting ducts in the vertical adjusting device and in the shock absorber to the interior space of the first bellows.

11. The wheel suspension of claim 9, wherein the vertical adjusting device defines a flow path in fluid communication with the auxiliary volume and the interior space surrounded by the first bellows.

12. The wheel suspension of claim 11, wherein the flow path is an annular gap.

13. The wheel suspension of claim 12, wherein the vertical adjusting device includes a threaded spindle, said suspension strut including a shock-absorber tube, with the annular gap being arranged between the threaded spindle and the shock-absorber tube and communicating via the connecting ducts with the interior space of the first bellows.

14. The wheel suspension of claim 13, wherein the connecting ducts are transverse bores in the threaded spindle.

15. The wheel suspension of claim 11, further comprising an additional bellows having interior spaces, respectively, which are connected in series with the flow path.

* * * * *